United States Patent
Hagenau

[11] Patent Number: 6,051,179
[45] Date of Patent: Apr. 18, 2000

[54] APPARATUS AND METHOD FOR PRODUCTION OF THREE-DIMENSIONAL MODELS BY SPATIAL LIGHT MODULATOR

[75] Inventor: William R. Hagenau, El Dorado, Calif.

[73] Assignee: Replicator Systems, Inc., El Dorado, Calif.

[21] Appl. No.: 09/040,829

[22] Filed: Mar. 18, 1998

Related U.S. Application Data

[60] Provisional application No. 60/039,362, Mar. 19, 1997.

[51] Int. Cl.[7] .............................. B29C 35/08; B29C 41/02
[52] U.S. Cl. ........................................ 264/401; 425/174.4
[58] Field of Search .......................... 264/401; 425/174.4

[56] References Cited

U.S. PATENT DOCUMENTS

| | | | |
|---|---|---|---|
| 2,775,758 | 12/1956 | Munz | 342/179 |
| 4,575,330 | 3/1986 | Hull | 425/174.4 |
| 4,752,498 | 6/1988 | Fudim | 425/174.4 |
| 4,801,477 | 1/1989 | Fudim | 264/401 |
| 4,945,032 | 7/1990 | Murphy et al. | 430/394 |
| 5,011,635 | 4/1991 | Murphy et al. | 425/174.4 |
| 5,015,424 | 5/1991 | Smalley | 264/401 |
| 5,104,592 | 4/1992 | Hull et al. | 264/401 |
| 5,106,288 | 4/1992 | Hughes | 425/174.4 |
| 5,130,064 | 7/1992 | Smalley et al. | 264/401 |
| 5,139,338 | 8/1992 | Pomerantz et al. | 356/376 |
| 5,139,711 | 8/1992 | Nakamura et al. | 264/401 |
| 5,151,813 | 9/1992 | Yamamoto et al. | 359/202 |
| 5,157,423 | 10/1992 | Zur | 346/159 |
| 5,171,490 | 12/1992 | Fudim | 425/174.4 |
| 5,172,262 | 12/1992 | Hornbeck | 359/223 |
| 5,182,055 | 1/1993 | Allison et al. | 264/401 |
| 5,182,056 | 1/1993 | Spence et al. | 264/401 |
| 5,192,469 | 3/1993 | Smalley et al. | 264/401 |
| 5,198,159 | 3/1993 | Nakamura et al. | 264/401 |
| 5,217,653 | 6/1993 | Mashinsky et al. | 264/401 |
| 5,247,180 | 9/1993 | Mitcham et al. | 425/174.4 |
| 5,256,340 | 10/1993 | Allison et al. | 264/401 |
| 5,273,691 | 12/1993 | Hull et al. | 264/401 |
| 5,287,435 | 2/1994 | Cohen et al. | 395/118 |
| 5,358,673 | 10/1994 | Heller et al. | 264/401 |
| 5,429,908 | 7/1995 | Hokuf et al. | 425/174.4 |
| 5,460,758 | 10/1995 | Langer et al. | 425/174.4 |
| 5,525,051 | 6/1996 | Takano | 425/174.4 |
| 5,536,467 | 7/1996 | Reichle et al. | 425/174.4 |
| 5,545,367 | 8/1996 | Bae et al. | 264/401 |
| 5,573,721 | 11/1996 | Gillete | 264/401 |
| 5,597,520 | 1/1997 | Smalley et al. | 264/401 |
| 5,609,812 | 3/1997 | Childers et al. | 264/401 |
| 5,609,813 | 3/1997 | Allison et al. | 264/401 |
| 5,650,260 | 7/1997 | Onishi | 425/174.4 |
| 5,651,934 | 7/1997 | Almquist et al. | 264/401 |
| 5,711,911 | 1/1998 | Hull | 264/401 |
| 5,753,171 | 5/1998 | Serbin et al. | 264/401 |
| 5,858,297 | 1/1999 | Ozawa et al. | 425/174.4 |

OTHER PUBLICATIONS

"Automatic Method for Fabricating a Three–Dimensional Plastic Model with Photo–Hardening Polymer", Hideo Kodama, Rev. Sci. Instrum., pp. 1770–1773, Nov. '81.

*Primary Examiner*—Robert Davis
*Attorney, Agent, or Firm*—Philip M. Shaw, Jr.; Crosby, Heafey, Roach & May

[57] ABSTRACT

An apparatus and the method of its operation for rapid prototyping of a three-dimensional object which includes a radiant energy source of a wide beam of radiant energy of suitable intensity and wavelength for curing a layer of photo-curable resin contained in an open vat, a spatial light modulator (SLM) having an array of pixel elements which are individually digitally controllable by a computer, for modulating the radiant energy beam projected from the radiant energy source on a pixel by pixel basis, to form a series of time sequential images of the cross-sectional laminae of the object, an optical system for focusing each image formed by the SLM, one at a time, onto successive layers of photo-curable resin for predetermined exposure times to thereby form stacked laminae of cured resin, each lamina of cured resin being in the shape of a different one of the cross-sectional laminae, and a piston support for lowering each lamina of cured resin after it is formed by the SLM and for depositing a layer of resin corresponding to the thickness of one cross sectional lamina of the three-dimensional object before the step of projecting a new image by the SLM. The SLM, the piston support for lowering, and the optical system operate repeatedly and sequentially until a complete copy of the object is thereby produced.

55 Claims, 5 Drawing Sheets

APPARATUS AND METHOD FOR PRODUCTION OF THREE-DIMENSIONAL MODELS BY SPATIAL LIGHT MODULATOR

CROSS-REFERENCE TO RELATED APPLICATION

This application claims the benefit of U.S. provisional patent application Ser. No. 60/039,362, filed by the Applicant on Mar. 19, 1997.

BACKGROUND

1. Technical Field of the Invention

This invention relates to an improvement of an apparatus and method of forming three-dimensional models from a liquid photopolymer.

2. Prior Art

Rapid Prototyping (RP) evolved to solve the need to accurately, economically, and, most importantly, quickly produce prototype parts and conceptual design models. Designers and engineers can now quickly produce models for early optimization, visualization, and verification. High quality, prototype parts, or models, produced by RP systems provide extremely valuable feedback in the process of product development. While many techniques are currently deployed commercially or are currently in development, the application of lithographic techniques has assumed the leading role. This process, known as stereolithography, forms solid parts from a liquid photopolymer and provides models that are useful for casting or molding as well as for conceptual evaluation.

Photopolymers are well known as liquids that solidify or harden with exposure to specific wavelength and intensity of electromagnetic radiation. This process is called photopolymerization or photohardening. Most commonly used in the field of rapid prototyping are ultraviolet (UV) or electron-beam (EB) curable acrylates and epoxy resins. When the proper radiation strikes the liquid, the top layer of the material will solidify. Just as cold air may solidify water into ice on the surface of a lake in winter, the radiation does not penetrate through the entire reservoir of liquid photopolymer. Control of the exposure time, and thereby the light energy impinged onto the liquid, limits the depth of polymerization to a programmed amount. In RP, the programmed layer effects finish quality of a completed model. The thinnest possible layer thickness leads to a smooth model finish. Careful control of the polymerization is also critical to the accuracy and strength of the finished model.

As radiation impinges the free surface of the liquid photopolymer, it is dispersed and absorbed. This effect limits the penetration of the radiation and thus the depth of hardening. This depth is known as the cure depth, $C_d$. The cure depth is a function of exposure and therefore, may be controlled by varying the radiation level applied to the imaging surface. In this manner, the layer thickness may be controlled to balance the speed of building and resolution.

Currently marketed and patented designs for stereolithography use light sources to alter the state of a light curable photopolymer. The liquid changes state to a solid form when light, with the correct wavelength and intensity, focuses upon it. The thin solidified layer becomes a sheet like surface that when built upon with many successive layers become a three-dimensional object. The shape of each layer is a cross section of a three-dimensional solid object designed on a computer aided design (CAD) system.

The process of forming three-dimensional objects by photohardening was proposed in U.S. Pat. No. 2,775,758 by Munz. Articles by Kodama in 1981 referenced the use of ultraviolet light for the photohardening of successive layers. Succeeding patents by Hull and Fudim (U.S. Pat. Nos. 4,575,330; 4,752,498; 4,801,477) described apparatuses and methods for layer wise building of models from photopolymer resins.

In a system commercialized by 3D Systems, Inc., of Valencia, Calif., and called a stereolithography apparatus (SLA), radiation energy that is provided by a laser, causes resin solidification. The laser beam is directed by a galvanometer or acousto-optic-modulator (AOM) to trace the cross-sectional image with the focused laser spot. The laminate layers solidified by the laser adhere due to overcure or overlapping of the cure depth. The exposure of the layer must cure deeper than the programmed resin layer thickness. In this manner, the new layer cures into the previous layer and adheres like a lamination. The programmed thickness of a layer must be less than the achieved cure depth in order to insure layer cohesiveness. With this method, a problem occurs. As the photopolymer cures, the volume of solidified material shrinks due to the internal chemical reaction. As a laser traces the image across a liquid surface, areas of the surface layer are at different stages of polymerization resulting in an uneven cure profile. As a new layer attaches to a previous layer, the shrinking of the new layer can cause the previous layer to curl in a bimetallic type affect. This is especially troublesome in large flat areas and creates internal stresses that lead to deformity and weakened model strength. This curl affect may cause the layers to stratify.

As previously mentioned, a light source is controlled to expose a cross-sectional pattern for a programmed exposure time. This process currently assumes two separate embodiments in exemplary systems as SLA and Solid Ground Curing (SGC). SLA provides arguably the higher accuracy of the two systems since the light source is a laser. The focused, intense spot of the laser provides a small, accurate point of light that causes solidification. This has the advantage of exposure limited to a very small area and therefore allows accurate reproduction of the cross-sectional image. One disadvantage of the system is that tracing an entire pattern with a small point of light is time consuming. As previously mentioned, the SLA system also suffers from an uneven cure profile that can lead to curl problems.

The SGC system utilizes an optical mask, generated by ionographic techniques, to reproduce the cross-sectional pattern. A high power UV emitting lamp exposes the entire cross section in a single shot. This greatly reduces the time of exposure for each layer and thus reduces the part build time. However, as previously mentioned, the polymerization process requires careful control of the light exposure. Inaccuracies in the SGC system introduced by the light source cause an uneven cure. Combined with the extensive mechanical systems used to generate the optical mask, this system sees a loss of accuracy. The SGC system compensates with a flying cutter to mill each layer flat as is it produced. This lengthens the time to build each layer and increases the number of mechanical systems. These mechanical support systems lead to high maintenance and loss of repeatability and accuracy over the life of the machine.

Early stereolithography systems coated the model by "deep dipping" below the surface and then returning to the desired level. This system caused problems as the thin, partially hardened layers were moved through the viscous liquid. The forces on the fragile structures caused mechanical inaccuracies. The wiper systems described in U.S. Pat. No. 5,651,934 (Almquist, et al.) succeeded in forming a thin layer with a dipping process that reduced the forces on the part. This system uses a blade to sweep across the surface to form a layer of the desired thickness. This sweeping process still requires a slow, short lowering of the model into the liquid reservoir and then raising it again. While reducing the stresses on the part, this process does put forces on the fragile parts that can lead to inaccuracies.

SUMMARY OF THE INVENTION

The above and other problems of prior art RP systems are overcome by the present invention of an improved three-dimensional object producing apparatus of the type for irradiating a liquid surface of a vat of liquid photo-curable resin to form a succession of cured resin layers corresponding to successive cross-sectional laminae of a three-dimensional object and incrementally lowering the cured resin layers below the liquid surface as they are formed to build up a three-dimensional copy of the object. The improvement according to the invention comprises a radiant energy source of a wide beam of radiant energy of suitable intensity and wavelength for curing a layer of the photo-curable resin, a spatial light modulator (SLM) having an array of pixel elements which are individually controllable, for modulating the radiant energy beam projected from the radiant energy source on a pixel-by-pixel basis, to form a series of time sequential images of the cross-sectional laminae of the object, optical means for focusing each image formed by the SLM, one at a time, onto successive layers of photo-curable resin for predetermined exposure times to thereby form stacked laminae of cured resin, each lamina of cured resin being in the shape of a different one of the cross-sectional laminae, and means for lowering each lamina of cured resin after it is formed by the SLM below the liquid surface by a distance corresponding to the thickness of one cross sectional lamina of the three-dimensional object before the projection of a new image by the SLM to thereby flow a layer of photo-curable liquid resin to cover the lamina of cured resin. The SLM, the means for lowering, and the optical means operate repeatedly and sequentially until a complete copy of the object is thereby produced.

In a preferred embodiment of the invention, the pixel elements are individually digitally addressable. The SLM is comprised of an array of micromirrors on a semiconductor memory chip, for example, an array of 800×600 micromirrors formed on a static random memory chip. Certain pixels' states are repeatedly toggled ON and OFF during the exposure so that during a given exposure period the pixels are ON a predetermined percentage of the time and OFF the remaining percentage of the time.

In one preferred embodiment, the optical means focusses radiant energy from each pixel of the SLM on a top layer of resin to create individual pixel resin segments and some pixel resin segments are deliberately underexposed, leaving them in a partially uncured state that is not completely solidified, so that when a subsequent photo-curable resin layer is applied, the pixel resin segment aligned above a pixel resin segment which is in a partially uncured state is exposed for a longer period to expose the aligned pixel resin segments of both the current and previous resin layers until they are solidified, whereby a pixel resin segment that is exposed and solidified through a succeeding layer acts as a peg that binds two layers together, resulting in an interlocking of layers to avoid delaminating.

In the preferred embodiments, control means control the SLM, the optical means and the means for lowering. The control means include a three-dimensional shape information memory for storing at least part of three-dimensional shape data defining the three-dimensional object to be formed and a computer for generating cross-sectional patterns and programmed with a computer aided design (CAD) software program. The computer analyzes the three dimensional shape data stored in the shape information memory and mathematically slices the solid model into layers of programmed thickness of Z height, where Z is the direction of lowering, to thereby produce a series of cross-sectional images of laminae. The control means is connected to the SLM, the optical means and the means for lowering.

The means for lowering includes a piston positioned beneath a layer of the resin within the upper part of the vat and means controlled by the computer for lowering and raising the piston. The edges of the piston are sealed to the vat edges so that no resin may pass directly from the lower part of the vat to the upper. The lower part of the vat (i.e., the portion below the piston) is filled with the resin, so that the lower part of the vat will source the resin that is deposited for the layer by layer build. To prepare a resin layer, the means for lowering lowers the piston down a distance equal to a programmed layer thickness to displace an amount of resin required to form a layer. A transfer tube is connected from the lower part of the vat to a position above the surface of the resin in the vat, so that resin is forced from the lower part of the vat through the transfer tube and deposited onto a top surface of the piston or other resin in the upper vat when the piston is lowered by the means for lowering.

In the preferred embodiments, the computer calculates the exposure time ($t_{ON(x, y)}$) of each pixel based on the resin properties, layer thickness required, and radiant energy intensity as follows:

$t_{ON(x, y)} = (E_c \exp(C_d/D_p))/H_{(x, y)}$, where $E_c$—Critical Exposure, a resin property, $D_p$—Penetration Depth, a resin property, $C_d$—Cure Depth, i.e. Layer Thickness, a programming parameter of the computer, and $H_{(x, y)}$—Radiant energy irradiance at a given pixel (x, y).

The invention also encompasses an improved three-dimensional object producing method of the type for irradiating a liquid surface of a vat of liquid photo-curable resin to form a succession of cured resin layers corresponding to successive cross-sectional laminae of a three-dimensional object and incrementally lowering the cured resin layers and depositing a new liquid layer as they are formed to build up a three-dimensional copy of the object. The improvement according to the invention comprises the steps of (a) generating computer aided design (CAD) digital data which define a plurality of two-dimensional graphical patterns that comprise laminae of a three-dimensional object to be formed and storing the CAD digital data in a memory, (b) generating a wide beam of radiant energy of suitable intensity and wavelength for curing a layer of the photo-curable resin, (c) reading out the CAD digital data and pixelating a graphical pattern to determine which pixels of a spatial light modulator (SLM) must be turned to an ON state in order to solidify corresponding individual pixel resin segments that, taken together, form a lamina of the photo-curable resin contained in a vat, (d) modulating the wide beam of radiant energy by individually digitally controlling each pixel element of an array of pixel elements of the SLM to modulate the radiant energy beam on a pixel-by-pixel basis to form a series of time sequential images of the cross-sectional laminae of the object, (e) focusing each image from the SLM, one at a time, onto successive layers of the photo-curable resin for predetermined exposure times to thereby form stacked laminae of cured resin, each lamina of cured resin being in the shape of a different one of the cross-sectional laminae, (f) lowering each lamina of cured resin after it is formed, and (g) depositing a layer of resin corresponding to the thickness of one cross sectional lamina of the three-dimensional object before the step of projecting a new image by the SLM.

The method necessarily also includes many of the operations of the apparatus as described above.

The current invention thus uses digital technology and spatial light modulators to expose successive layers of a photopolymer resin in a single shot. Exposure of each resin segment is controlled during the single shot by a corresponding pixel of the SLM.

In the current invention, the polymerization process can be terminated and restarted by pulse width modulation (PWM) techniques. The PWM technique toggles the state of a pixel rapidly to control the intensity of light impinged on the surface. This method has the advantage of controlling solidification by delivering short bursts of radiation energy. This pulsing light energy causes truncation of a polymerization chain and results in shorter molecules with a higher degree of cross-linking. Shorter polymerized molecules and a high degree of cross-linking leads to a smoother finish and higher mechanical strength of a completed model.

Because the layer forming subsystem of the invention displaces the model and its surrounding liquid reservoir together, this synchronous movement eliminates stresses put on the fragile model when moving it through a stationary reservoir of viscous fluid. At the same time, the mechanism displaces the required volume of resin for the succeeding layer. Since the piston device displaces both the liquid level (build surface) and the succeeding volume of liquid, the liquid level is accurate for the succeeding layer. This maintains the projection plane for the image at the height required for accurate hardening of the cross-sectional image. This system has higher accuracy because the resin displaced has an identical volume to the movement of the build surface and model.

The piston displacement causes both the displacement of the previously built laminae and the creation of the new layer of liquid resin. Since the displacement and layer thickness are directly proportional, the computer can easily select varying layer thickness by simply adjusting the piston displacement. The computer must also adjust the exposure time for the varying layer thickness by calculating with a corresponding cure depth, $C_d$.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
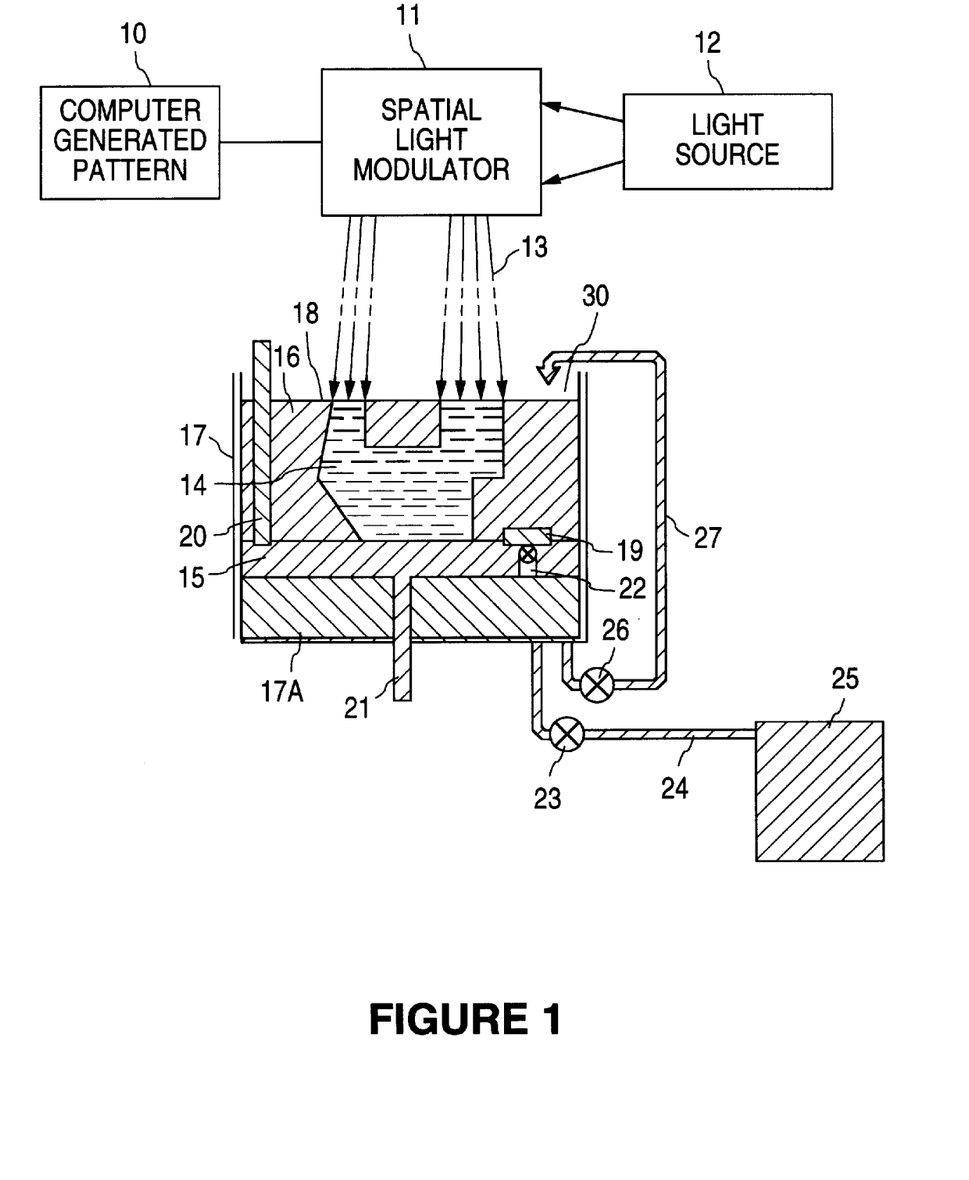
FIG. 1 is a combined sectional view of the apparatus and block diagram of a preferred embodiment of the invention.

An embodiment of the complete RP system according to the invention is illustrated in FIG. 1. There is provided a programmed computer 10 for generating cross-sectional patterns 10. A light source 12, a reflective spatial light modulator (SLM) 11, optics 44 (shown in FIG. 3 only) for projecting a reflected pixel image 13 from the SLM 11 to a photoresin 16 contained in a vat or reservoir 17, and a build support piston 15 are all controlled by the computer 10. The operation of these components will now be described with reference to two major subsystems, the Projection Subsystem and the Layer Forming Subsystem, both of which are coordinated by the computer 10.

The Projection Subsystem

Figure 2:
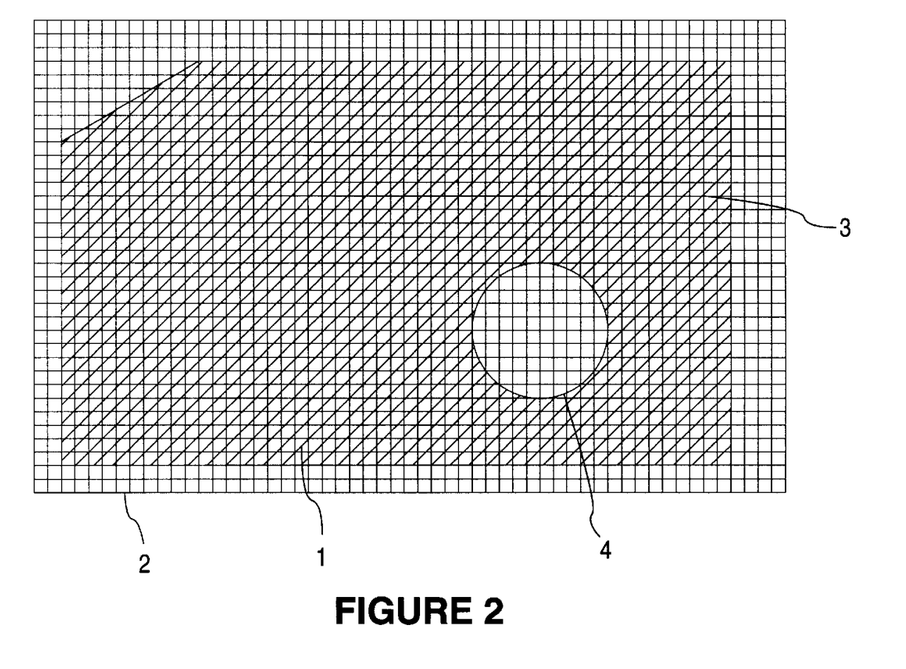
FIG. 2 is a programmed layer pattern as projected onto the surface the pixel array of a spatial light modulator of the embodiment depicted in FIG. 1.
Figure 3:
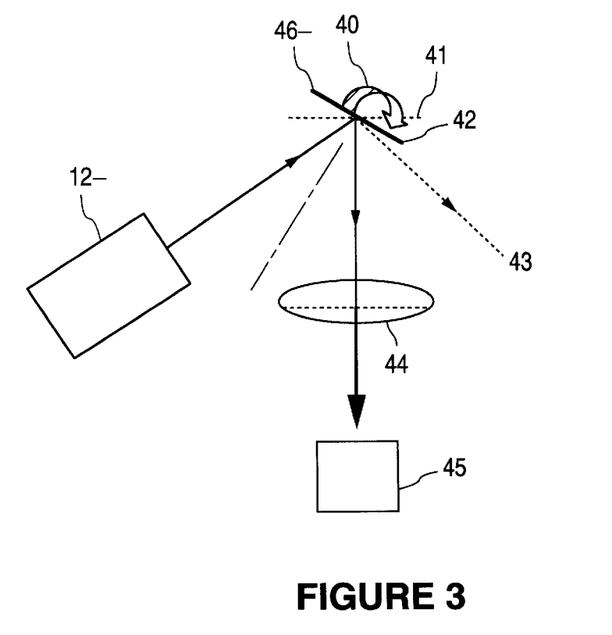
FIG. 3 is a single pixel mirror of a reflective spatial light modulator in ON and OFF states together with projection optics of the apparatus shown in FIG. 1.

The Projection Subsystem projects the cross-sectional image of the model onto the resin surface 18 and contains the following components: the light source 12, the SLM 11, a shutter (not shown) and the optics 44 (FIG. 3). The SLM 11 interfaces with the control computer 10, which provides the data for the image to project. The computer 10 analyzes the 3D CAD data and mathematically "slices" the solid model into layers of programmed thickness or Z-axis height. As illustrated in FIG. 2, the computer 10 then overlays a map or grid 2 of the pixel layout on the SLM 11. By comparing this overlay to the cross-sectional image, the computer 10 determines which pixels must be turned ON (shown as shaded area 1) and which pixels must be turned OFF (shown by the unshaded area 3) in order to project the accurate cross-section image of the slice. This process is called pixelation or pixelating determines which micromirrors must be activated to reflect a designed pattern. FIG. 2 shows an array of pixels in an (x, y) grid overlaid on a sample cross-sectional image. For a desired cross-sectional pattern to solidify, certain pixels must be toggled to an ON position for a sufficient exposure time to harden the segments of the photopolymer resin 16. Areas where light is not reflected (OFF) will remain liquid. As shown in FIG. 3, each pixel 40 may be switched to an ON position 42 to reflect the light source 12 toward a small segment 45 of the resin 16 (referred to hereinafter as a pixel resin segment as distinct from a pixel of the SLM 11) or to an OFF position 41 to deflect light away in a direction 43 by rotating a mirror surface 46. A pixel 40 must be maintained in the ON state long enough to apply the required light energy to solidify to a programmed depth. This pixelating, allows light exposure of the programmed pattern onto the liquid surface, and causes the solidification of a thin surface layer.

Because of the exposure control allowed by an SLM 11, layer thickness may be varied by the computer 10. Varying layer thickness allows optimum Z-axis resolution and speed and allows the computer 10 to compensate for changing model shapes. For example, the apparatus builds layers as thin as possible in order to avoid a stair stepping phenomenon in the sloping sides of an object. In practical application, a layer must be thick enough to adhere to the previous layer. In addition, the computer 10 may select to build layers at maximum penetration depth in order to achieve maximum build speed. The thick layers provide better strength and integrity of the completed model. This invention allows the computer 10 to make layer thickness decisions based on these criteria.

The computer 10 calculates the ON time for each pixel based on the resin 16 properties, layer thickness (cure depth) required, and light intensity. First, we must realize that the light intensity varies across the image display. Typically, a light source 12 like the Cermax Xenon Illuminator from ILC Technology can provide a good source of UV light in the wavelength range of 325 to 360 nm. A typical output of these lamps has a Gaussian profile. This leads to greater illumination near the center of the image projection. Based on the characteristics of the light source 12 and its expected output, the irradiance of the pixels and the image projection can be estimated. A more precise method is to measure the light output with a sensing device in order to accurately define the light irradiance $H_{(x, y)}$ projected by each pixel of the SLM 11. The exposure time (ON time) of each pixel is a function as related by the working curve equation as follows:

$t_{ON(x, y)} = (E_c \exp(C_d/D_p))/H_{(x, y)}$, where $t_{ON(x, y)}$—ON time for pixel (x, y)

$E_c$—Critical Exposure, a resin property $D_p$—Penetration Depth, a resin property $C_d$—Cure Depth or Layer Thickness, a programming parameter of the computer 10

$H_{(x, y)}$—Light irradiance at a given pixel (x, y).

The exposure time of each layer and pixel must be adjusted as the light source 12 loses intensity with extended use. The computer 10 compensates by adjusting the ON time of individual pixels. The light source 12 may be filtered or collimated or polarized through optics not shown to provide accurate projection of the radiation required to solidify the chosen resin 16 in the cross-sectional image. Some popular resins 16 require a wavelength in the long UV range of 325 to 360 nm, however, any appropriate source of radiation may be used.

As shown at 4 in FIG. 2, the pixel resolution may not always match the programmed shape. In some cases, a pixel may require a "partial" ON status. The computer 10 also determines the ON/OFF status of these partial pixels based on the desired surface finish of the model. Typical decision factors may be based on the percent of pixel that is ON the image. Other factors may include the status of adjacent pixels and the preceding and subsequent layers.

The preferred embodiment of the invention uses a reflective SLM 11 from Texas Instruments called a digital micromirror device (DMD). This device is described in U.S. Pat. No. 5,172,262 (Hombook, et al., issued Dec. 15, 1992), which is incorporated herein by reference, and is believed to be commercially available. The DMD array of micromirrors 46 (a single one of which is shown in FIG. 3) is constructed on a semiconductor memory chip, namely a static random access memory (SRAM) chip (not shown). The individual addressable locations of the SRAM may be electrically charged in a high or low voltage state. The DMD mirrors 46 rotate toward the SRAM locations that are assigned a high voltage (5 V.C. nominal) by the computer 10. Typical dimensions of a DMD pixel 40 are 0.017 mm×0.017 mm with aluminum reflective surfaces. Projection enlargements must consider the final reflected pixel image size and the resolution requirements of the model. If the projected pattern is too large, the reflected pixel image will become larger than the required resolution.

Each pixel mirror 46 is constructed over two opposing SRAM locations allowing the mirror 46 to be biased toward either address location. In this way, two separate reflective states are achieved, which allows light to be reflected from each pixel onto or away from the pixel resin segment. In this semiconductor device, the reflective surface of each pixel is 0.017 mm square. In order to achieve the largest possible part building area, the projection optics are selected to magnify the reflected image from the DMD. Due to the importance of surface quality, the projected pixel size must be balanced with the overall projected image size. For example, a magnification of 9× will project each image from 0.017 mm (0.7 mils) up to 0.153 mm (6 mils). This is an acceptable image resolution for most modeling applications. The build area for an array of 800×600 micromirrors 46 projected with 9× magnification is 122×92 mm (4.8×3.6 square inches). This is probably smaller than desired for most part building applications, but larger size arrays are already coming into production. The resolution and part build area may be adjusted through the selection of optical components. These optics may include an automated zoom option to adjust the build area and resolution as required for the programmed part. Based on the chosen resolution, the grid or map of the projected image as shown in FIG. 2 must be sized accordingly. Exposure times must be adjusted since the enlargement of the projected image causes a proportional reduction of the irradiance, $H_{(x, y)}$.

The SLM 11 turns the pixels ON to project the image. The shutter (not shown) is opened to allow light onto the SLM 11, and the light is reflected onto the resin 16 below with the shape of the cross-sectional image. The shutter mechanism may be eliminated by turning the light source 12 on and off as required or by setting all pixels OFF. However, cycling the light source 12 may reduce its life. The shutter is held open for the longest required pixel ON time for that layer. As the ON time $t_{ON(x, y)}$ expires for each pixel, it is toggled to OFF for the remainder of the layer exposure. After the layer exposure is complete, the pixels are reset, and the next layer may be formed.

An alternate embodiment allows the ON pixels' state to be toggled during the exposure. This has the added advantage of pulse curing the resin 16. The curing process is actually polymerization of the resin 16. This is a process of linking together small monomer molecules into larger polymer molecules. By pulsing the radiation that initiates this process, e.g., by opening and closing the shutter or by rotating the micromirrors 46, a higher degree of polymerization or cross-linking of the molecules can be achieved. This is due to a higher molecular flow that allows a larger number of monomers to flow to the location where polymerization may occur. This higher flow reduces one of the principal reactions that lead to termination of the polymerization process. The terminating reaction is called occlusion or "frozen mobility" and prevents the flow of monomers to the site where polymerization may occur. Occlusion represents one of the major terminators of the polymerization process and, therefore, reduced occlusion leads to a higher degree of cross-linking. The advantages of higher polymerization are an increased green-strength and reduced curl and warp.

The pixels are toggled with pulse width modulation (PWM) techniques. A square wave pulse input can accomplish the desired pulsing. For pulse curing, the $t_{ON(x, y)}$ is the sum of the ON time for each pulse. For example, if the pixel is toggle ON 50% and OFF 50%, then $t_{ON(x, y)}$ must be doubled to achieve the required exposure time.

The Layer Forming Subsystem

The second subsystem is the Layer Forming Subsystem that creates the thin layers of resin 16 for building the part 14. This system is responsible for creating the layers of photopolymer resin 16 of the programmed thickness one after the other. The Layer Forming Subsystem comprises the following components: piston 15, resin 16, reservoir 17, imaging forming build surface 18, filter 19, volume compensator 20, piston arm 21, various valves (table return valve 22, fill valve 23, and transfer valve 26) for controlling the flow of the liquid resin 16, fill tube 24, fill tank 25, transfer tube 27, and dispense head 30.

The preparation for building a part 14 requires that the lower section 17a of the reservoir 17 (i.e., the portion below the piston 15) be filled with the selected photopolymer resin 16. This lower reservoir 17a will source the resin 16 that is deposited for the layer-by-layer build. To fill the lower reservoir 17a, the fill tank 25 is placed in a position above the reservoir 17 to allow gravity to effect the flow of the resin 16. The fill tube 24 is attached between the lower reservoir 17a and the fill tank 25. The piston 15 is moved from a bottom position to a top position allowing the resin 16 to flow in behind it and fill the lower reservoir 17a.

This step is not required before building each part since the resin 16 may safely remain in the reservoir 17 between builds. However, some resins 16 can spoil after extended periods in the reservoir 17. At the completion of the build, the piston 15 is returned to the top position to allow the part to be removed. The check valve or valves 22 in the piston 15 surface are opened in order to allow the resin 16 to flow by gravity back into the lower reservoir 17a thus preparing for the next build. This return valve contains a filter 19 to remove defects or particles from the previously used resin 16. When the top position of the piston 15 is reached, the valve 22 is closed to prevent the flow of resin 16 from the lower reservoir 17a through the piston 15.

After filling the lower reservoir 17a, the fill valve 23 in the fill tube 24 is closed and the fill tank 25 may be placed below the reservoir 17. This will later facilitate the removal of resin 16 for cleaning or to exchange with another resin 16.

To prepare the resin layer 18, the piston 15 is moved down a distance equal to the programmed layer thickness. The piston 15 position is changed by a motion control (not shown which is operated by the computer 10) and capable of fine position and speed control. Suitable such systems include stepper motors or servomotors. This downward motion will displace the amount of resin 16 required to form a layer. The resin 16 is forced from the lower reservoir 17a through the transfer tube 27 and deposited onto the top surface of the piston 15. The transfer tube 27 may contain a check valve 26 to insure that resin 16 does not flow back into the lower reservoir 17a. The transfer tube 27 outlet is positioned over the reservoir 17. The transfer tube 27 typically feeds the resin 16 through nozzles or apertures or spray heads 30 that dispense the resin 16 in an even layer. Note that although only one head 30 is shown, in actual practice there would be a plurality of such heads 30 depositing the resin across the surface of the reservoir 17.

Figure 6A:
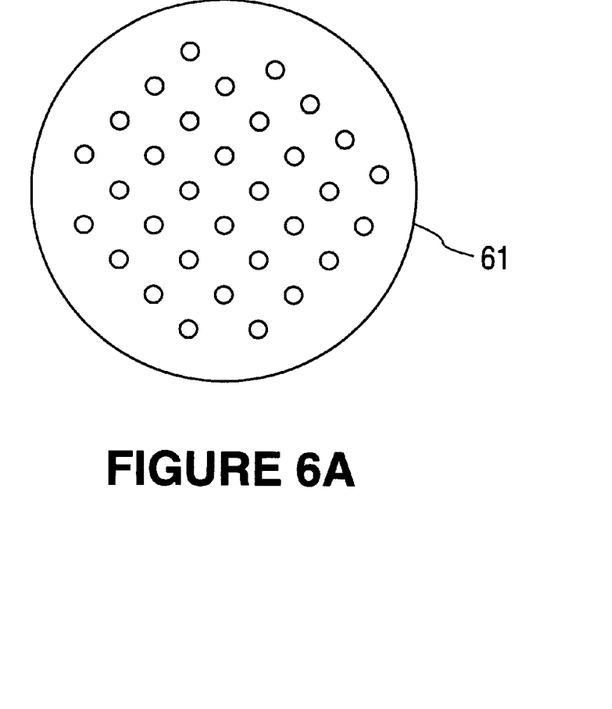
FIGS. 6a and 6b are side views in elevation of the vat lid of the apparatus depicted in FIG. 1.
Figure 6B:
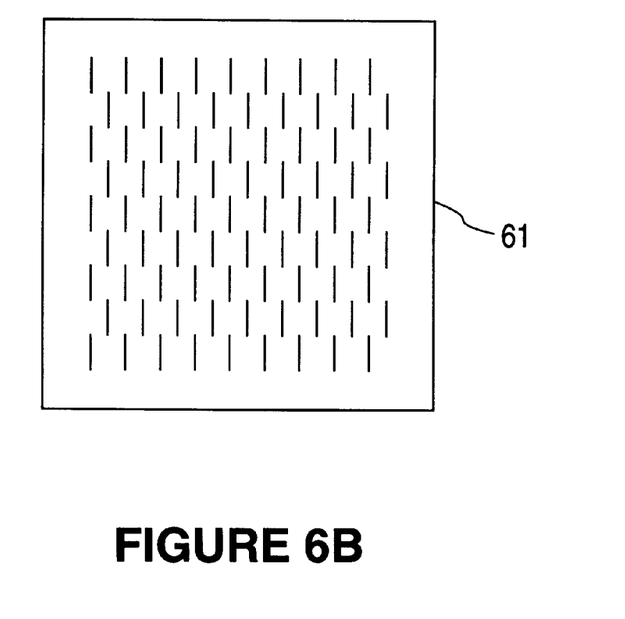

For the fastest and even layering, the transfer tubes feed through nozzles or apertures or spray heads positioned directly over the previously formed laminae. They are positioned over the reservoir surface by a reservoir lid 61. The lid 61 is positioned over the build area by a solenoid or other actuating device. A typical lid shape and pattern that may be used to provide fast and even layering is shown in FIGS. 6a and 6b only.

The reservoir lid 61 has other advantages. It is comprised of materials that do not allow the transmittance of radiation that may cure the resin. This protects the resin 16 from stray light radiation, and may also protect from solvents used in cleaning the machine. The exterior (top) of the cap may contain sensors to test light irradiance with a test routine between layers. This allows calibration of the irradiance information during the layering routine and without imping-ing any radiation onto the resin. One test routine is to open the shutter with all pixels ON to measure the irradiance. Another routine is to test individual pixels ON in varying sectors in order to estimate the irradiance from pixels in those sectors. The data from these test sensors may be used in calculations of the $t_{ON(x, y)}$ described above.

The advantages of this layering method are two-fold. First, the parts are moved together with the surrounding fluid. This avoids the forces that are put on the fragile parts if they are submerged and lifted through the surrounding viscous liquid. Secondly, the method allows a fast means for depositing an accurate one layer thick volume of the liquid resin 16. The thickness of the volume of resin 16 deposited on top of the model will match the downward displacement of the model, allowing a very accurate layer thickness.

Note that the volume of resin 16 displaced is the cross-sectional area of the piston 15 times the Z-axis travel distance of the piston 15. Since the piston arm reduces the area of the piston 15, a volume compensator 20 must be placed above the piston 15 to equalize the cross-sectional area. This is usually the same shape and volume as the piston arm 21. The volume compensator 20 may include a bladder or other means for increasing or decreasing the volume of the compensator in order to adjust the liquid level of the build surface. Alternatively, the computer 10 could automatically control the amount of resin 16 to provide such compensation.

Also, the filling of new resin 16 in the Layer Forming Subsystem requires the transfer tube 27 to be primed. This is accomplished during the fill process, by opening the transfer valve 26 to allow the resin 16 to flow through the transfer tube 27. The fill tank 25 upper position uses gravity to facilitate the flow of the resin 16. The valve 26 remains open until all air is removed from the transfer tube 27. For this process, a reservoir 17 lid (not shown) is usually positioned over an additional container to catch any spilled resin 16. However, since the resin 16 is quite expensive, an alternate method may be used. In this alternate method, the reservoir 17 lid is positioned above the build area and excess resin 16 that flows through during the primer process, is allowed to fill the build area. This can lead to uncertainties in the liquid level for which adjustments must be made.

Since the volume of excess resin 16 deposited during the priming process is likely to be greater than the desired thickness of the first layer, a build surface other than the piston 15 top surface must be placed into the build area. The new build surface is usually a wire mesh or foam that allows the liquid resin 16 to permeate. The liquid level is then adjusted with reference to this new build surface. For adjustments to be accomplished, the computer 10 moves the piston 15 down to align the liquid level with the new build surface 18. The first layer of the model is built from the new build surface 18 as the starting point. Measurements of the liquid level are measured by various devices including floats or reflective sensors. The computer 10 compares the measurements and adjusts the piston 15 position to compensate. An external displacement pump may be used to make additional adjustments of the liquid level by adding resin 16 from an external reservoir (not shown) or the fill tank 25.

Most resins 16 used for part building shrink during the curing process. Shrinkage is a result of the polymerization process that causes a volumetric shrinkage with increased molecular bonding. Shrinkage may be compensated for with a dispensing pump that adds small amounts of resin 16 to the build area. This compensator may add small amounts of liquid to maintain the curing surface at the desired distance from the Projection Subsystem. Alternately, a zoom type optical lens may be used to adjust the imaging plane of the Projection Subsystem in order to match the curing surface. The amount of shrinkage is dependent on the resin 16 properties as well as volume of the solid model cured. Models with a large relative volume will require additional adjustments to the liquid level of the cure surface. The amount of compensation for shrinkage may be calculated from the volume of the solid model and the characteristics of the resin 16 used. Various measuring techniques may also be employed to measure the liquid surface level.

The shrinkage effect mentioned above can be controlled and reduced by this invention due to the digital exposure control. In the current invention, the layers cure through incremental exposure. The curl found during the cure of a newly added layer is caused by over curing the new layer too early. Over curing is required to laminate the layers of the model. However, if an exposure dosage capable of over curing the required depth is provided too quickly, the curl problem is aggravated. The overcure serves to laminate the layers of resin 16 that have varying degrees of polymerization. The newer layer is shrinking at a faster rate during its polymerization than the previous layer that is more fully hardened. If the overcure laminates these layers too early, the shrinkage of the new layer causes the curl. However, with the digital exposure control provided by the SLM 11, the exposure is provided in stages to reduce the curl. An exposure capable of curing the resin 16 to a depth less than the layer thickness is provided to partially cure the new layer. Then a pause in the exposure allows higher cross-linking to occur in the newly formed layer. This brings the polymerization and shrinkage rate in the two layers to a similar level. Then in a subsequent exposure, additional curing allows the overcure to laminate the two layers together.

Figure 4:
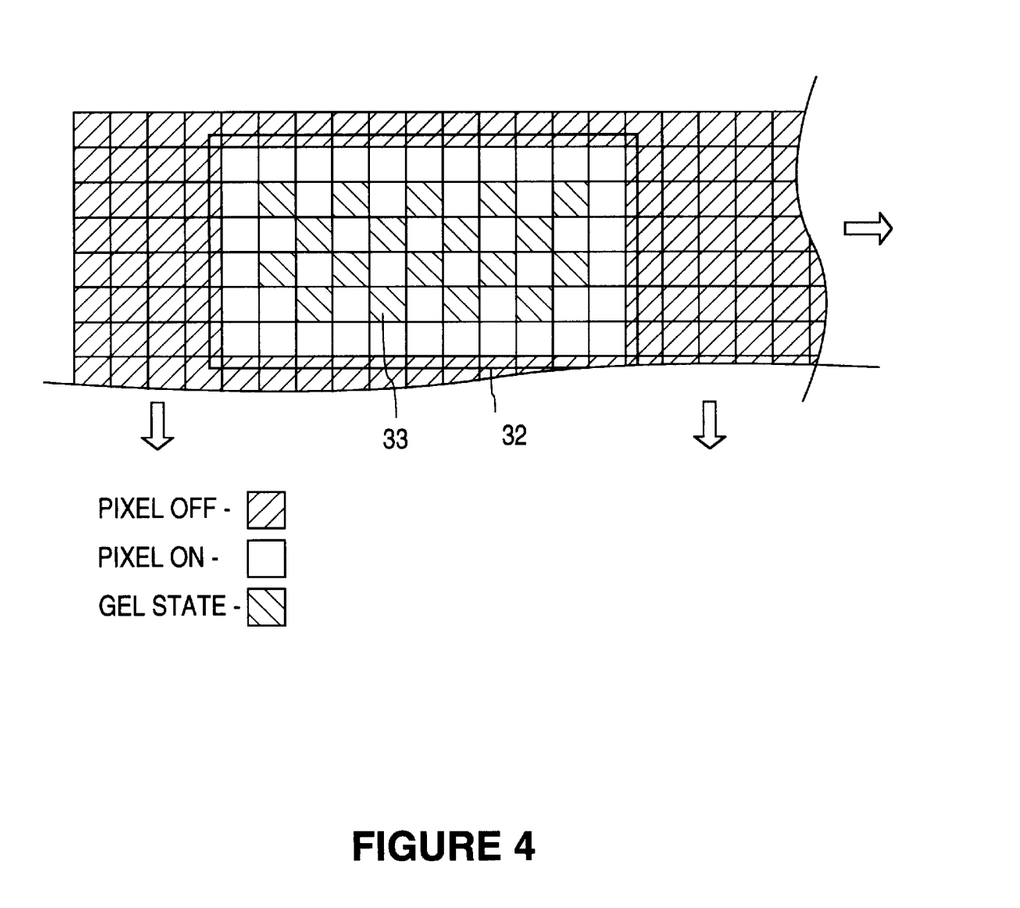
FIG. 4 is a layout of the spatial light modulator pixels with a programmed layer exposure pattern and a layer binding pixel pattern according to the invention.

An additional method using the digital exposure is called Layer Binding (LB). This method avoids stratifying the layers found with SLA and SGC systems. In this LB method, as shown in FIG. 4, a programmed layer pattern 32 is partially exposed in a pixel pattern as chosen by the computer 10. In this pattern, or ones similar, some pixels are underexposed 33, leaving them in an uncured state that is not completely solidified. When a subsequent layer is applied, the pixel above an uncured state must remain ON for a longer period to expose both the current and previous layers until solidified. A pixel segment that is exposed and solidified through some succeeding layer acts as a post or peg that binds the two layers together. This results in an interlocking of layers and avoids de-lamination. The Layer Binding method reduces the internal stress between adjacent layer laminations as found in other RP systems.

The new layer of resin deposited on the build surface 18 may be allowed to flow over the area until it reaches a uniform thickness. However, this can take some time depending on the viscosity of the resin 16. Methods to reduce the time of spreading the layer may include wiper blades, brushes, wires, or compressed air. As previously mentioned, the transfer tube 27 may feed into spray head nozzles 30 that distribute the liquid more evenly across the cross section. Additionally, the transfer tube 27 may contain heating elements that elevate the temperature of the resin 16. The advantage of heating the resin is to decrease the viscosity for easier layering and to allow more rapid and complete curing of the resin 16 during the exposure phase. This method of heating resin in the transfer tubes heats only the resin layer immediately affected and is more efficient than heating the entire reservoir 17 of liquid resin 16 or the machine environment.

The computer 10 coordinates the actions of the two subsystems. The Layer Forming Subsystem must complete formation of the layer and remove the cap before the image is projected. Additional wait times may be required for the resin layer to flow out to a flat layer. The Projection Subsystem may proceed to calculate the ON times for each pixel, but must then hold before opening the shutter and projecting light.

Figure 5:
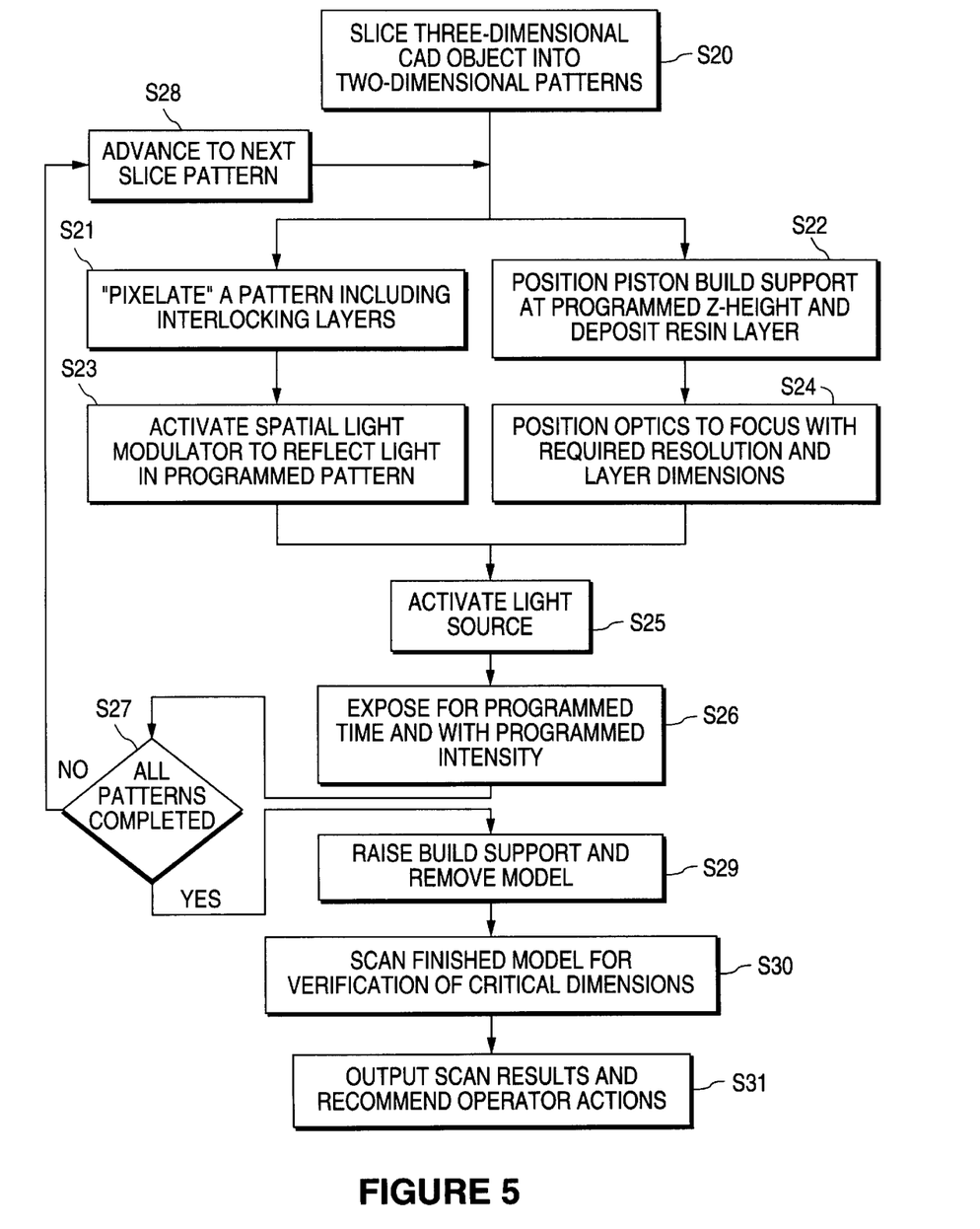
FIG. 5 is a block diagram of process steps according to one embodiment of the invention.

FIG. 5 shows a step-by-step operation of the apparatus when performing the Layer Binding method. Note that steps S21, S23 are performed in parallel with steps S22, S24.

In step S20 the computer 10 generates the two-dimensional patterns that comprise a three-dimensional object to be formed.

In step S21 the computer 10 pixelates the graphical pattern thus determining which pixels 40 of the SLM 11 must be turned to the ON state in order to solidify the laminate layer. Also in this step, the computer 10 will determine which pixel resin segments 45 to partially cure into a gel state in order to create layer binding.

In step S22 the computer 10 lowers the build support piston 15 thus depositing the liquid layer of the programmed layer thickness onto the build surface 18. After depositing the layer, the RP system may even the layer by wiping away any excess liquid or bubbles and, thus, increasing accuracy of the layer thickness.

In step S23, the computer 10 activates the correct pixels 40 of the SLM 11 by controlling activation means to rotate the pixel mirror 46 to turn ON a pixel 40.

In step S24, optics 44 are positioned to project light to the correct pattern image size 13. A projection should not be enlarged beyond the desired resolution, which is dependent on the size of a projected pixel image.

In step S25, the light source 12 is activated to deliver radiation energy to the SLM 11 and reflect onto the liquid surface 18.

In step S26, each pixel 40 maintains the ON state long enough to solidify the programmed layer thickness. The computer 10 controls the radiation energy delivered by shortening or extending the pixel ON time, and may therefore create layer binding as previously discussed.

If at step S27 the computer 10 determines that all pattern slices have not been projected, i.e., the model is incomplete, then the process proceeds to step S28 where the computer 10 moves ahead one slice in the process and resumes with steps S21 and S22. If at step S27 the computer 10 determines that the model is complete, then the system will proceed to step S29.

In step S29, the build support piston 15 rises out of the liquid medium and the model may be removed.

In step S30, the SLM 11 or other means may be utilized to create a three-dimensional optical scan of the completed model. From the scan information, the computer 10 can recommend post process operator actions in step S31. Examples of recommended actions include removing or adding material or making programming or mechanical adjustments.

This invention has many advantages over the prior systems including:

Speed—The part building time will be greatly reduced by the single shot exposure with greater polymerization control. The layering system also provides faster preparation of an accurate layer.

Accuracy—The controlled curing of the digital system improves the accuracy of the finished part. This controlled curing allows for higher polymerization and reduced curl.

Flexibility—The handling system described herein allows simplified removal and addition of the resin. This allows more flexibility to choose from the growing selection of photohardenable materials. In addition, the exchange of the light source is lower cost than exchanging the laser in other systems. This allows selection of resins that require other wavelengths. This flexibility is important as research into photohardenable materials with ceramic particulate or other additives leads to improved model quality. In addition, the system has the flexibility of varying pixel resolution to allow the choice of small high-resolution parts or large lower resolution parts.

Reliability—The addition of mechanical systems required by other single shot systems increases the maintenance cost of those other systems.

While the description above has assumed that the source 12 radiates "light," it should be apparent that other types of radiant energy could also suffice, provided that the radiant energy is of a wavelength and intensity to cause the resin to cure. Similarly, while a particular type of spatial "light" modulator has been disclosed and described as being the preferred device for modulating the radiant energy which impinges upon the resin, other types of spatial radiant energy modulators could be used. What is required is that the spatial light modulator have an array of pixel elements which are individually controllable, preferably digitally, for modulating the radiant energy beam projected from a radiant energy source on a pixel by pixel basis, to form a series of time sequential images of the cross-sectional laminae of the object being modeled. For example, the spatial light modulator might be a light transmissive device which can control radiant energy passing through it on a pixel-by-pixel basis. Further, a plurality of spatial light modulators could be used to increase the build area while improving the resolution by reducing the required magnification.

Further, although the present invention has been described in terms of liquid photo polymers/photo-curable resins, it other, possibly less advantageous embodiments, photohardenable resins or adhesives or even non-liquid materials which will harden in the UV or even non-UV wavelengths might be used. For example, finely powered photohardenable materials might be used.

Moreover, although the present invention contemplates a non-laser light source because of the advantages heretofore described, in applications where a higher power density is required, a laser may be used as the light source.

Although the present invention has been shown and described with respect to preferred embodiments, various changes and modifications are deemed to lie within the spirit and scope of the invention as claimed.

What is claimed is:

1. An improved three-dimensional object producing apparatus of the type for irradiating a liquid surface of a vat of liquid photo-curable resin to form a succession of cured resin layers corresponding to successive cross-sectional laminae of a three-dimensional object, and incrementally lowering the cured resin layers below the liquid surface as they are formed to build up a three-dimensional copy of the object, wherein the improvement comprises:

a radiant energy source of a wide beam of radiant energy of suitable intensity and wavelength for curing a layer of the photo-curable resin;

a spatial light modulator (SLM) having an array of pixel elements which are individually controllable, for modulating the radiant energy beam projected from the radiant energy source on a pixel-by-pixel basis, to form a series of time sequential images of the cross-sectional laminae of the object;

optical means for focusing each image formed by the SLM, one at a time, onto successive layers of photo-curable resin for predetermined exposure times to thereby form stacked laminae of cured resin, each lamina of cured resin being in the shape of a different one of the cross-sectional laminae; and means for positioning each lamina of cured resin after it is formed by the SLM below the liquid surface corresponding to the thickness of one cross-sectional lamina of the three-dimensional object before the projection of a new image by the SLM to thereby flow a layer of photo-curable liquid resin to cover the lamina of cured resin;

wherein the SLM, the means for lowering, and the optical means operate repeatedly and sequentially until a complete copy of the object is thereby produced; and wherein certain pixels' states are repeatedly toggled ON and OFF during the exposure so that during a given exposure period the pixels are ON a predetermined percentage of the time and OFF the remaining percentage of the time.

2. A three-dimensional object producing apparatus according to claim 1, wherein the pixel elements are individually digitally addressable.

3. A three-dimensional object producing apparatus according to claim 1, wherein the SLM is comprised of an array of micromirrors on a semiconductor memory chip.

4. A three-dimensional object producing apparatus according to claim 3, wherein the array of micromirrors is 800×600 micromirrors or larger.

5. A three-dimensional object producing apparatus according to claim 1, wherein the SLM is comprised of an array of micromirrors with reflective aluminum surfaces.

6. A three-dimensional object producing apparatus according to claim 1, wherein the optical means focusses radiant energy from each pixel of the SLM on a top layer of resin to create individual pixel resin segments, and some pixel resin segments are deliberately underexposed, leaving them in a partially uncured state that is not completely solidified, so that when a subsequent photo-curable resin layer is applied, the pixel resin segment aligned above a pixel resin segment which is in a partially uncured state is exposed for a longer period to expose the aligned pixel resin segments of both the current and previous resin layers until they are solidified, whereby a pixel resin segment that is exposed and solidified through a succeeding layer acts as a peg that binds two layers together, resulting in an interlocking of layers to avoid delaminating.

7. A three-dimensional object producing apparatus according to claim 1, wherein the optical means focusses radiant energy, and the focus is adjusted by means of a zoom motor.

8. A three-dimensional object producing apparatus according to claim 7, wherein the zoom motor is controlled by the computer to adjust the build area size and resolution.

9. A three-dimensional object producing apparatus according to claim 1, wherein the optical means filters light of wavelengths other than those required for photopolymerization.

10. A three-dimensional object producing apparatus according to claim 1, wherein the optical means collimates the radiation source.

11. A three-dimensional object producing apparatus according to claim 1, wherein the optical means polarizes the radiation source.

12. A three-dimensional object producing apparatus according to claim 1, further comprising:
control means for controlling the SLM, the optical means and the means for lowering, the control means including:
a three-dimensional shape information memory for storing at least part of three-dimensional shape data defining the three-dimensional object to be formed;
a computer for generating cross-sectional patterns and programmed with a computer aided design (CAD) software program, the computer analyzing the three-dimensional shape data stored in the shape information memory, and mathematically slicing the solid model into layers of programmed thickness of Z height, where Z is the direction of lowering, to thereby produce a series of cross-sectional images of laminae;
means for connecting the control means to the SLM, the optical means and the means for lowering.

13. An improved three-dimensional object producing apparatus of the type for irradiating a liquid surface of a vat of liquid photo-curable resin to form a succession of cured resin layers corresponding to successive cross-sectional laminae of a three-dimensional object, and incrementally lowering the cured resin layers below the liquid surface as they are formed to build up a three-dimensional copy of the object, wherein the improvement comprises:
a radiant energy source of a wide beam of radiant energy of suitable intensity and wavelength for curing a layer of the photo-curable resin;
a spatial light modulator (SLM) having an array of pixel elements which are individually controllable, for modulating the radiant energy beam projected from the radiant energy source on a pixel-by-pixel basis, to form a series of time sequential images of the cross-sectional laminae of the object;
optical means for focusing each image formed by the SLM, one at a time, onto successive layers of photo-curable resin for predetermined exposure times to thereby form stacked laminae of cured resin, each lamina of cured resin being in the shape of a different one of the cross-sectional laminae;
means for positioning each lamina of cured resin after it is formed by the SLM below the liquid surface corresponding to the thickness of one cross-sectional lamina of the three-dimensional object before the projection of a new image by the SLM to thereby flow a layer of photo-curable liquid resin to cover the lamina of cured resin;
wherein the SLM, the means for lowering, and the optical means operate repeatedly and sequentially until a complete copy of the object is thereby produced;
control means for controlling the SLM, the optical means and the means for lowering, the control means including:
a three-dimensional shape information memory for storing at least part of three-dimensional shape data defining the three-dimensional object to be formed;
a computer for generating cross-sectional patterns and programmed with a computer aided design (CAD) software program, the computer analyzing the three-dimensional shape data stored in the shape information memory, and mathematically slicing the solid model into layers of programmed thickness of Z height, where Z is the direction of lowering, to thereby produce a series of cross-sectional images of laminae;
means for connecting the control means to the SLM, the optical means and the means for lowering; and wherein:
the means for lowering includes a piston sealed to the sides of the vat to prevent the transfer of resin past the piston and means controlled by the computer for lowering and raising the piston;
the portion of the vat below the piston is filled with the resin, so that the portion of the vat below the piston will source the resin that is deposited on the build surface for the layer by layer build.

14. A three-dimensional object producing apparatus according to claim 13, wherein:
to prepare a resin layer, the means for lowering lowers the piston down a distance equal to a programmed layer thickness to displace an amount of resin required to form a layer.

15. A three-dimensional object producing apparatus according to claim 14, further comprising a transfer tube connected from the portion of the vat below the piston to a position above the surface of the resin in the vat, wherein resin is forced from the portion of the vat below the piston through the transfer tube and deposited onto the build surface when the piston is lowered by the means for lowering.

16. A three-dimensional object producing apparatus according to claim 15, further comprising means for heating the transfer tube to elevate the temperature of the resin within the transfer tube to a temperature to improve viscosity or rate of polymerization.

17. A three-dimensional object producing apparatus according to claim 15, further comprising means for positioning the transfer tube above the resin surface to more evenly or quickly distribute the resin layer.

18. A three-dimensional object producing apparatus according to claim 15, further comprising spray heads connected to the transfer tube that dispense the resin in an even layer over the top surface of the piston.

19. A three-dimensional object producing apparatus according to claim 13, further comprising:
a piston arm attached to a lower surface of the piston and connected to the lowering means for controlling movement of the piston; and
a volume compensator having the same shape and volume as the piston arm, and placed above the piston to equalize the cross-sectional area for purposes of resin replacement.

20. A three-dimensional object producing apparatus according to claim 19, further comprising:
a bladder or other means for adjusting the volume of the volume compensator.

21. A three-dimensional object producing apparatus according to claim 20, further comprising:
the volume compensator is adjusted by the computer to raise or lower the liquid level of the build surface most commonly to adjust for shrinkage of the hardened resin.

22. A three-dimensional object producing apparatus according to claim 12, wherein the computer overlays a map of a pixel layout on the SLM and compares this overlay to the cross-sectional image of a lamina and determines which pixels must be turned ON and which pixels must be turned OFF in order to project the accurate cross-sectional image of the lamina.

23. A three-dimensional object producing apparatus according to claim 12, further comprising:

pixel toggle means controlled by the computer for repeatedly toggling ON and OFF certain pixels so that during a given exposure period for curing a lamina of resin, the pixels are ON a predetermined percentage of the time and OFF the remaining percentage of the time.

24. A three-dimensional object producing apparatus according to claim 23, wherein the pixel toggle means uses pulse width modulation (PWM) to achieve pixel toggling by supplying a square wave pulse input to the SRAM to produce a desired pulsing.

25. A three-dimensional object producing apparatus according to claim 12, wherein the computer calculates the exposure time (the ON time) for each pixel based on the resin properties, layer thickness required, and radiant energy intensity.

26. A three-dimensional object producing apparatus according to claim 25, wherein the radiant energy intensity is measured with sensors.

27. A three-dimensional object producing apparatus according to claim 25, herein the radiant energy intensity is estimated from the known properties of the radiation source.

28. A three-dimensional object producing apparatus according to claim 25, wherein the exposure time ($t_{ON(x, y)}$) of each pixel is a function as related by the working curve equation:

$t_{ON(x, y)} = (E_c \exp(C_d/D_p))/H_{(x, y)}$, where $E_c$—Critical Exposure, a resin property, $D_p$—Penetration Depth, a resin property, $C_d$—Layer Thickness, a programming parameter of the computer, and H(x, y)—Radiant energy irradiance at a given pixel (x, y).

29. A three-dimensional object producing apparatus according to claim 12, wherein the SLM is comprised of an array of micromirrors on a static random access memory (SRAM) chip.

30. A three-dimensional object producing apparatus according to claim 29, wherein individual addressable locations of the SRAM can be electrically charged in either a high voltage state or a low voltage state to cause rotation of the micromirrors toward the SRAM locations.

31. A three-dimensional object producing apparatus according to claim 30, wherein each micromirror is constructed over two opposing SRAM locations allowing the micromirror to be biased toward either of two address locations so that two separate reflective states are achieved, which allows radiant energy to be reflected for each pixel onto or away from the liquid surface of the photo-curable resin.

32. A three-dimensional object producing apparatus according to claim 31, wherein the reflective surface of each micromirror is 0.017 mm square.

33. An improved three-dimensional object producing method of the type for irradiating a liquid surface of a vat of liquid photo-curable resin to form a succession of cured resin layers corresponding to successive cross-sectional laminae of a three-dimensional object and incrementally lowering the cured resin layers below the liquid surface as they are formed to build up a three-dimensional copy of the object, wherein the improvement comprises the steps of:

(a) generating computer aided design (CAD) digital data which define a plurality of two-dimensional graphical patterns that comprise laminae of a three-dimensional object to be formed and storing the CAD digital data in a memory;

(b) generating a wide beam of radiant energy of suitable intensity and wavelength for curing a layer of the photo-curable resin;

(c) reading out the CAD digital data and pixelating a graphical pattern to determine which pixels of a spatial light modulator (SLM) must be turned to an ON state in order to solidify corresponding individual pixel resin segments that, taken together, form a lamina of the photo-curable resin contained in a vat;

(d) modulating the wide beam of radiant energy by individually digitally controlling each pixel element of an array of pixel elements of the SLM to modulate the radiant energy beam on a pixel-by-pixel basis to form a series of time sequential images of the cross-sectional laminae of the object;

(e) focusing each image from the SLM, one at a time, onto successive layers of the photo-curable resin for predetermined exposure times to thereby form stacked laminae of cured resin, each lamina of cured resin being in the shape of a different one of the cross-sectional laminae;

(f) lowering each lamina of cured resin after it is formed;

(g) depositing a layer of resin corresponding to the thickness of one cross-sectional lamina of the three-dimensional object before the step of projecting a new image by the SLM; and wherein the modulating step further comprises the step of repeatedly toggling ON and OFF certain pixels' states during the exposure period so that the certain pixels are ON a predetermined percentage of the time and OFF the remaining percentage of the time.

34. An improved three-dimensional object producing method according to claim 33, further comprising the step of determining which pixel resin segments to partially cure into a gel state in order to create layer binding.

35. An improved three-dimensional object producing method according to claim 33, further comprising the step of determining which pixel resin segments to partially cure in order to reduce curl.

36. An improved three-dimensional object producing method of the type for irradiating a liquid surface of a vat of liquid photo-curable resin to form a succession of cured resin layers corresponding to successive cross-sectional laminae of a three-dimensional object and incrementally lowering the cured resin layers below the liquid surface as they are formed to build up a three-dimensional copy of the object, wherein the improvement comprises the steps of:

(a) generating computer aided design (CAD) digital data which define a plurality of two-dimensional graphical patterns that comprise laminae of a three-dimensional object to be formed and storing the CAD digital data in a memory;

(b) generating a wide beam of radiant energy of suitable intensity and wavelength for curing a layer of the photo-curable resin;

(c) reading out the CAD digital data and pixelating a graphical pattern to determine which pixels of a spatial light modulator (SLM) must be turned to an ON state in order to solidify corresponding individual pixel resin segments that, taken together, form a lamina of the photo-curable resin contained in a vat;

(d) modulating the wide beam of radiant energy by individually digitally controlling each pixel element of an array of pixel elements of the SLM to modulate the radiant energy beam on a pixel-by-pixel basis to form a series of time sequential images of the cross-sectional laminae of the object;

(e) focusing each image from the SLM, one at a time, onto successive layers of the photo-curable resin for predetermined exposure times to thereby form stacked laminae of cured resin, each lamina of cured resin being in the shape of a different one of the cross-sectional laminae;

(f) lowering each lamina of cured resin after it is formed;

(g) depositing a layer of resin corresponding to the thickness of one cross-sectional lamina of the three-dimensional object before the step of projecting a new image by the SLM;

wherein the step of lowering includes lowering a piston within the vat, and filling the portion of the vat below the piston with the resin, so that the portion of the vat below the piston will source the resin that is deposited for the layer-by-layer build.

37. An improved three-dimensional object producing method according to claim 36, further comprising the step, after the step of lowering the piston, of recoating an upper surface of the piston by wiping away any excess liquid or bubbles to assure accuracy of the layer thickness.

38. A three-dimensional object producing method according to claim 33, wherein the modulating step and lowering step further comprise the steps of deliberately underexposing some pixel resin segments, leaving them in a partially uncured state that is not completely solidified, applying a subsequent photo-curable resin layer over the partially uncured pixel resin segments, and exposing pixel resin segments aligned above the partially uncured pixel resin segments for a longer period to expose the aligned pixel resin segments of both the current and previous resin layers until they are solidified, whereby a pixel resin segment that is exposed and solidified through a succeeding layer acts as a peg that binds two layers together, resulting in an interlocking of layers to avoid delaminating.

39. A three-dimensional object producing method according to claim 38, wherein exposure is delayed or adjusted so that more than two layers are interlocked.

40. A three-dimensional object producing method according to claim 33, wherein the exposure time ($t_{ON(x, y)}$) of each pixel is a function as related by the working curve equation:

$t_{ON(x, y)} = (E_c \exp (C_d/D_p))/H_{(x, y)}$ where $E_c$—Critical Exposure, a resin property, $D_p$—Penetration Depth, a resin property, $C_d$—Layer Thickness, a programming parameter of the computer, and $H_{(x, y)}$—Radiant energy irradiance at a given pixel (x, y).

41. A three-dimensional object producing method according to claim 33, wherein exposure is delayed or adjusted so that more than two layers are interlocked.

42. A three-dimensional object producing method according to claim 33, wherein the SLM is used for optically scanning the completed three-dimensional object.

43. A three-dimensional object producing method according to claim 39, wherein optical scan data is used to calibrate the apparatus.

44. An improved three-dimensional object producing apparatus of the type for irradiating a surface of a container of flowable medium capable of solidification when subjected to prescribed radiant energy to form a succession of hardened medium layers corresponding to successive cross-sectional laminae of a three-dimensional object, and incrementally lowering the hardened medium layers below the flowable surface of the medium as they are formed to build up a three-dimensional copy of the object, wherein the improvement comprises:

a radiant energy source of a wide beam of radiant energy of suitable intensity and wavelength for hardening a layer of the medium;

a spatial light modulator (SLM) having an array of pixel elements which are individually controllable, for modulating the radiant energy beam projected from the radiant energy source on a pixel-by-pixel basis, to form a series of time sequential images of the cross-sectional laminae of the object;

optical means for focusing each image formed by the SLM, one at a time, onto successive layers of the medium for predetermined exposure times to thereby form stacked laminae of hardened medium, each lamina of hardened medium being in the shape of a different one of the cross-sectional laminae;

means for positioning each lamina of hardened medium after it is formed by the SLM below the flowable surface of the medium corresponding to the thickness of one cross-sectional lamina of the three-dimensional object before the projection of a new image by the SLM to thereby flow a layer of the medium to cover the lamina of hardened medium;

wherein the SLM, the means for lowering, and the optical means operate repeatedly and sequentially until a complete copy of the object is thereby produced; and wherein certain pixels' states are repeatedly toggled ON and OFF during the exposure so that during a given exposure period the pixels are ON a predetermined percentage of the time and OFF the remaining percentage of the time.

45. A three-dimensional object producing apparatus according to claim 44, wherein the pixel elements are individually digitally addressable.

46. A three-dimensional object producing apparatus according to claim 44, wherein the SLM is comprised of an array of micromirrors on a semiconductor memory chip.

47. A three-dimensional object producing apparatus according to claim 44, wherein the optical means focusses radiant energy from each pixel of the SLM on a top layer of medium to create individual pixel medium segments, and some pixel medium segments are deliberately underexposed, leaving them in a partially uncured state that is not completely solidified, so that when a subsequent flowable medium layer is applied, the pixel medium segment aligned above a pixel medium segment which is in a partially uncured state is exposed for a longer period to expose the aligned pixel medium segments of both the current and previous medium layers until they are solidified, whereby a pixel medium segment that is exposed and solidified through a succeeding layer acts as a peg that binds two layers together, resulting in an interlocking of layers to avoid delaminating.

48. A three-dimensional object producing apparatus according to claim 44, wherein the optical means filters light of wavelengths other than those required for photopolymerization.

49. A three-dimensional object producing apparatus according to claim 44, wherein the optical means collimates the radiation source.

50. A three-dimensional object producing apparatus according to claim 44, wherein the optical means polarizes the radiation source.

51. A three-dimensional object producing apparatus according to claim 44, further comprising:

control means for controlling the SLM, the optical means and the means for lowering, the control means including:

a three-dimensional shape information memory for storing at least part of three-dimensional shape data defining the three-dimensional object to be formed;

a computer for generating cross-sectional patterns and programmed with a computer aided design (CAD) software program, the computer analyzing the three-dimensional shape data stored in the shape information memory, and mathematically slicing the solid model into layers of programmed thickness of Z height, where Z is the direction of lowering, to thereby produce a series of cross-sectional images of laminae;

means for connecting the control means to the SLM, the optical means and the means for lowering.

52. A three-dimensional object producing apparatus according to claim 51, wherein the computer overlays a map of a pixel layout on the SLM and compares this overlay to the cross-sectional image of a lamina and determines which pixels must be turned ON and which pixels must be turned OFF in order to project the accurate cross-sectional image of the lamina.

53. A three-dimensional object producing apparatus according to claim 51, wherein the pixel toggle means uses pulse width modulation (PWM) to achieve pixel toggling by supplying a square wave pulse input to the SRAM to produce a desired pulsing.

54. A three-dimensional object producing apparatus according to claim 51, wherein the computer calculates the exposure time (the ON time) for each pixel based on the medium properties, layer thickness required, and radiant energy intensity.

55. A three-dimensional object producing apparatus according to claim 54, wherein the exposure time ($t_{ON(x, y)}$) of each pixel is a function as related by the working curve equation:

$t_{ON(x, y)} = (E_c \exp(C_d/D_p))/H_{(x, y)}$, where $E_c$—Critical Exposure, a medium property, $D_p$—Penetration Depth, a medium property, $C_d$—Layer Thickness, a programming parameter of the computer, and $H_{(x,y)}$—Radiant energy irradiance at a given pixel (x, y).

* * * * *